US009466155B2

(12) United States Patent
Miljkovic et al.

(10) Patent No.: US 9,466,155 B2
(45) Date of Patent: Oct. 11, 2016

(54) SYSTEM TO VIEW AUTOMOBILE DIAGNOSTIC INFORMATION

(71) Applicant: Automatic Labs, Inc., San Francisco, CA (US)

(72) Inventors: Ljubinko Miljkovic, Oakland, CA (US); Ramprabhu Jayaraman, San Francisco, CA (US)

(73) Assignee: Automatic Labs, Inc., San Francisco, CA (US)

( * ) Notice: Subject to any disclaimer, the term of this patent is extended or adjusted under 35 U.S.C. 154(b) by 22 days.

(21) Appl. No.: 14/050,701

(22) Filed: Oct. 10, 2013

(65) Prior Publication Data

US 2014/0107886 A1 Apr. 17, 2014

Related U.S. Application Data

(60) Provisional application No. 61/712,546, filed on Oct. 11, 2012.

(51) Int. Cl.

| | |
|---|---|
| ***G06F 19/00*** | (2011.01) |
| ***G07C 5/00*** | (2006.01) |
| ***G07C 5/08*** | (2006.01) |

(52) U.S. Cl.
CPC ............. *G07C 5/008* (2013.01); *G07C 5/0825* (2013.01); *G07C 2205/02* (2013.01)

(58) Field of Classification Search
CPC .......... G06F 19/00; G06F 7/00; G07C 5/008
USPC ........................................................ 701/29.6
See application file for complete search history.

(56) References Cited

U.S. PATENT DOCUMENTS

| | | | | |
|---|---|---|---|---|
| 2003/0036832 | A1 | 2/2003 | Kokes et al. | |
| 2003/0125851 | A1 * | 7/2003 | Andreasen et al. | 701/29 |
| 2004/0016804 | A1 * | 1/2004 | Namaky | G07C 5/0816 235/435 |
| 2004/0093299 | A1 * | 5/2004 | Bodin et al. | 705/37 |
| 2006/0101311 | A1 * | 5/2006 | Lipscomb | G07C 5/008 714/47.1 |
| 2006/0106510 | A1 * | 5/2006 | Heffington | B60R 16/0231 701/29.6 |
| 2006/0107217 | A1 * | 5/2006 | Lu et al. | 715/733 |
| 2007/0078571 | A1 | 4/2007 | Heffington | |
| 2008/0065289 | A1 * | 3/2008 | Bertosa | G01M 17/007 701/33.2 |

(Continued)

FOREIGN PATENT DOCUMENTS

| | | | |
|---|---|---|---|
| JP | 2007008336 | A | 1/2007 |
| KR | 1020120075555 | A | 7/2012 |

*Primary Examiner* — Yonel Beaulieu
*Assistant Examiner* — Martin Weeks
(74) *Attorney, Agent, or Firm* — Donald R. Boys; Central Coast Patent Agency, Inc.

(57) ABSTRACT

A system has a Link device coupled to an on-board diagnostics (OBD) system of a vehicle, the Link device enabled to monitor trouble codes presented by the OBD system, and having a port enabled to transmit to and receive from external devices, a mobile communication device, the device having a display screen, and an application (App) executing on the mobile communication device from a non-transitory medium. The Link device receives trouble codes from the vehicle OBD system and transmits them to either to the App or to an Internet-connected server, where the trouble codes are associated with the issues they represent, and wherein the App, having associated the trouble codes with the issues or having received the association data from the server, presents a display to the driver comprising at least the problem represented by the problem code and suggested action to correct the problem.

9 Claims, 3 Drawing Sheets

(56) References Cited

U.S. PATENT DOCUMENTS

2009/0112394 A1 4/2009 Lepejian et al.
2010/0021176 A1* 1/2010 Holcombe et al. ........... 398/115
2011/0071724 A1* 3/2011 Heine et al. .................... 701/33
2011/0149720 A1* 6/2011 Phuah et al. .................. 370/216
2012/0046824 A1* 2/2012 Ruther et al. ................ 701/31.5
2012/0259504 A1* 10/2012 Lowrey et al. .............. 701/31.5
2014/0052531 A1* 2/2014 Kent et al. ................. 705/14.49

* cited by examiner

SYSTEM TO VIEW AUTOMOBILE DIAGNOSTIC INFORMATION

CROSS-REFERENCE TO RELATED APPLICATIONS

The present application claims priority to Provisional Patent Application (PPA) 61/712,546 filed Oct. 11, 2012, and all disclosure of the referenced PPA is incorporated at least by reference.

BACKGROUND OF THE INVENTION

1. Field of the Invention

The present invention is in the technical area of computer-implemented inventions, and pertains more particularly to a system linking a driver's mobile communication device to the diagnostic system of a vehicle, with an app that displays to the driver any problems and potential problems, and optionally proposed solutions.

2. Description of Related Art

Existing vehicle diagnostic decoders at the time of the present patent application are standalone appliances that connect to a vehicle onboard diagnostics (OBD) port to decode and display the active code(s) on a small display. The codes must then be looked up in a separate manual and correlated with the specific vehicle involved to understand the nature of the code and possible remedies. Further, these conventional appliances are not intended to remain connected to the OBD port and thus cannot give pro-active warning of engine problems.

What is clearly needed in the art is a system that remains connected, and is enabled to display problems as they occur to a driver of the vehicle.

BRIEF SUMMARY OF THE INVENTION

In an embodiment of the invention a system is provided, comprising a Link device coupled to an on-board diagnostics (OBD) system of a vehicle, the Link device enabled to monitor trouble codes presented by the OBD system, and having a communication port enabled to transmit to and receive from external devices, a mobile communication device associated with a driver of the vehicle, the device having a display screen, and an application (App) executing on the mobile communication device from a non-transitory medium. The Link device receives trouble codes from the vehicle OBD system and transmits them to either to the App or to an Internet-connected server, where the trouble codes are associated with the issues they represent, and wherein the App, having associated the trouble codes with the issues or having received the association data from the server, presents a display to the driver comprising at least the problem represented by the problem code and suggested action to correct the problem.

In one embodiment the Link device connects to an OBD connector of the vehicle. Also in one embodiment the communication port comprises a near-field pairing mechanism enabled to pair with a pairing mechanism in the mobile communication device. Also in one embodiment the display screen is a touch screen. In one embodiment the display further comprises identity of the vehicle, the actual trouble codes detected, and a link button providing a signal to the Link device to cause the OBD system to cancel the trouble code or codes. In another embodiment the system further comprises an Internet-connected server accessible to the mobile communication device through connection through a cellular network and an Internet gateway, and the App associates the trouble codes with the issues they represent through contact with the Internet-connected server that has a stored resource of data and information concerning vehicle makes and models, trouble codes, and associated troubles and possible corrections. In some embodiments the trouble codes received and displays presented are archived either by the mobile communication device or by the Internet-connected server for future reference, in a manner that the archived material may be downloaded and printed.

In another aspect of the invention a method is provided, comprising steps for receiving trouble codes from a vehicle on-board diagnostics (OBD) system by a Link device coupled to the (OBD) system, transmitting the trouble codes to a mobile communication device associated with a driver of the vehicle, associating the trouble codes with the issues they represent by an application (App) executing on the mobile communications device, and presenting a display on a display screen of the mobile communications device, the display comprising at least the problem represented by the problem code and suggested action to correct the problem.

In one embodiment of the method the Link device connects to an OBD connector of the vehicle. Also in one embodiment the communication port comprises a near-field pairing mechanism enabled to pair with a pairing mechanism in the mobile communication device. Still in one embodiment the display screen may be a touch screen.

In another embodiment of the method the display further comprises identity of the vehicle, the actual trouble codes detected, and a link button providing a signal to the Link device to cause the OBD system to cancel the trouble code or codes. In another embodiment there is further an Internet-connected server accessible to the mobile communication device through connection through a cellular network and an Internet gateway, and the App associates the trouble codes with the issues they represent through contact with the Internet-connected server that has a stored resource of data and information concerning vehicle makes and models, trouble codes, and associated troubles and possible corrections. Trouble codes received and displays presented may be archived either by the mobile communication device or by the Internet-connected server for future reference, in a manner that the archived material may be downloaded and printed.

DETAILED DESCRIPTION OF THE INVENTION

As stated above, in conventional art diagnostics appliances are stand-alone appliances used infrequently, and that must be correlated with manuals associating the diagnostic codes with actual issues. The system of the invention, described in enabling detail below, provides for being connected to a vehicle's diagnostic information in real time, and for providing immediate advice on how to deal with any issue that develops.

Figure 1:
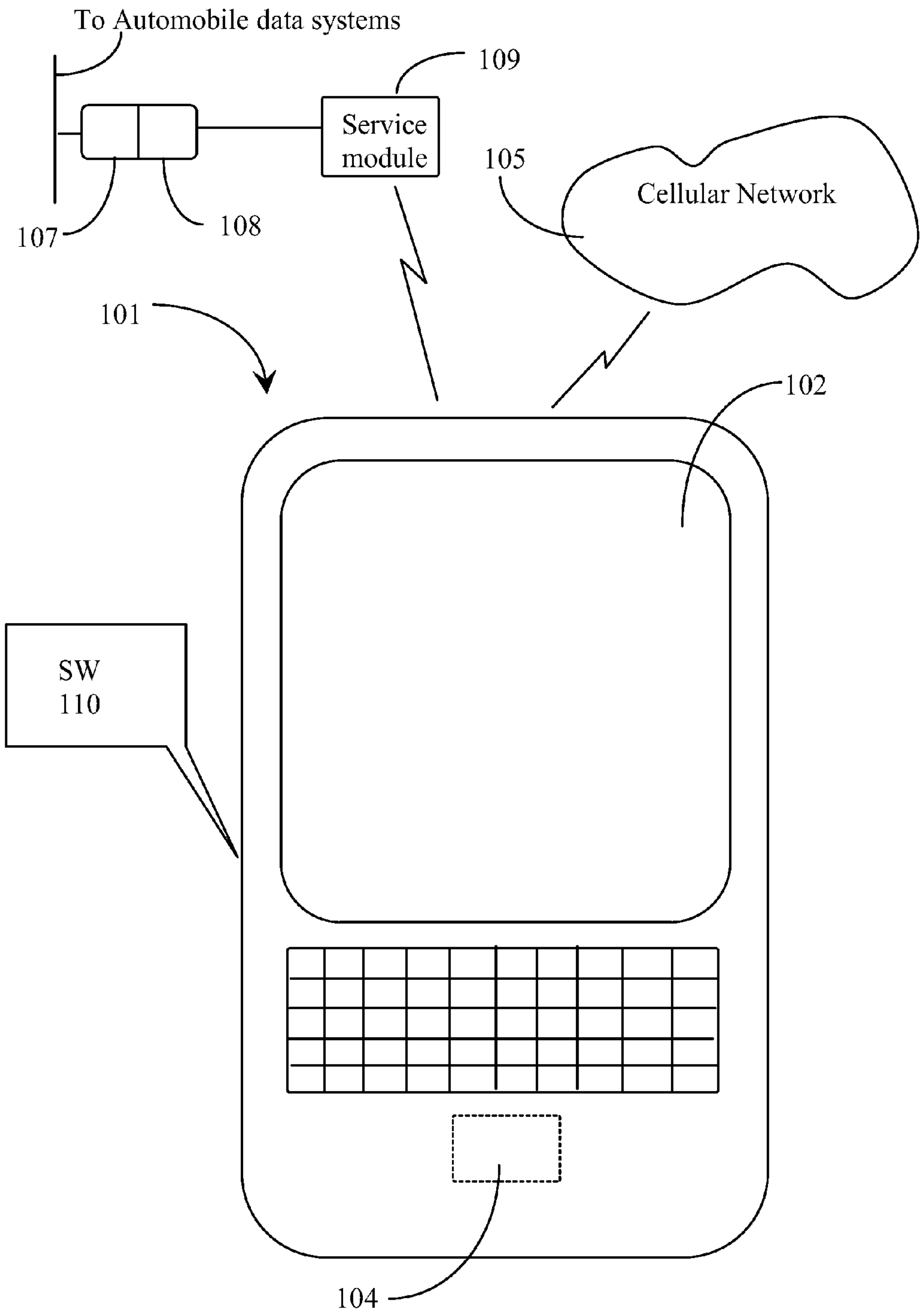
FIG. 1 is diagram illustrating elements and connection in an embodiment of the present invention.

FIG. 1 illustrates a computerized communication device 101, such as a cellular smart telephone having a display screen 102, which may be a touch screen. Device 101 is shown paired by near-field communication pairing with a Link device 109, connected by an OBD connector 108 to an OBD connector 107 of a vehicle. Device 101 is also coupled wirelessly in this example to a cellular network 105, although that is not required in all embodiments of the invention.

Device 101, by virtue of being coupled to Link device 109 which is coupled to the computer systems of the vehicle, is thus enabled to access data from on-board computerized devices in the vehicle, to manipulate and display data from the vehicle to a driver, and through an application 110 executing on the device, provide potential solutions to problems. The device may also transmit this data to and through cellular network 105.

In some embodiments Link device 109 may be built into the electrical system of the vehicle, and may pair either with device 101, or may incorporate a cellular link by which data may be uploaded to Server 205, which may transmit data and information ton device 101 or another digital device in use by the driver of the vehicle.

Figure 2:
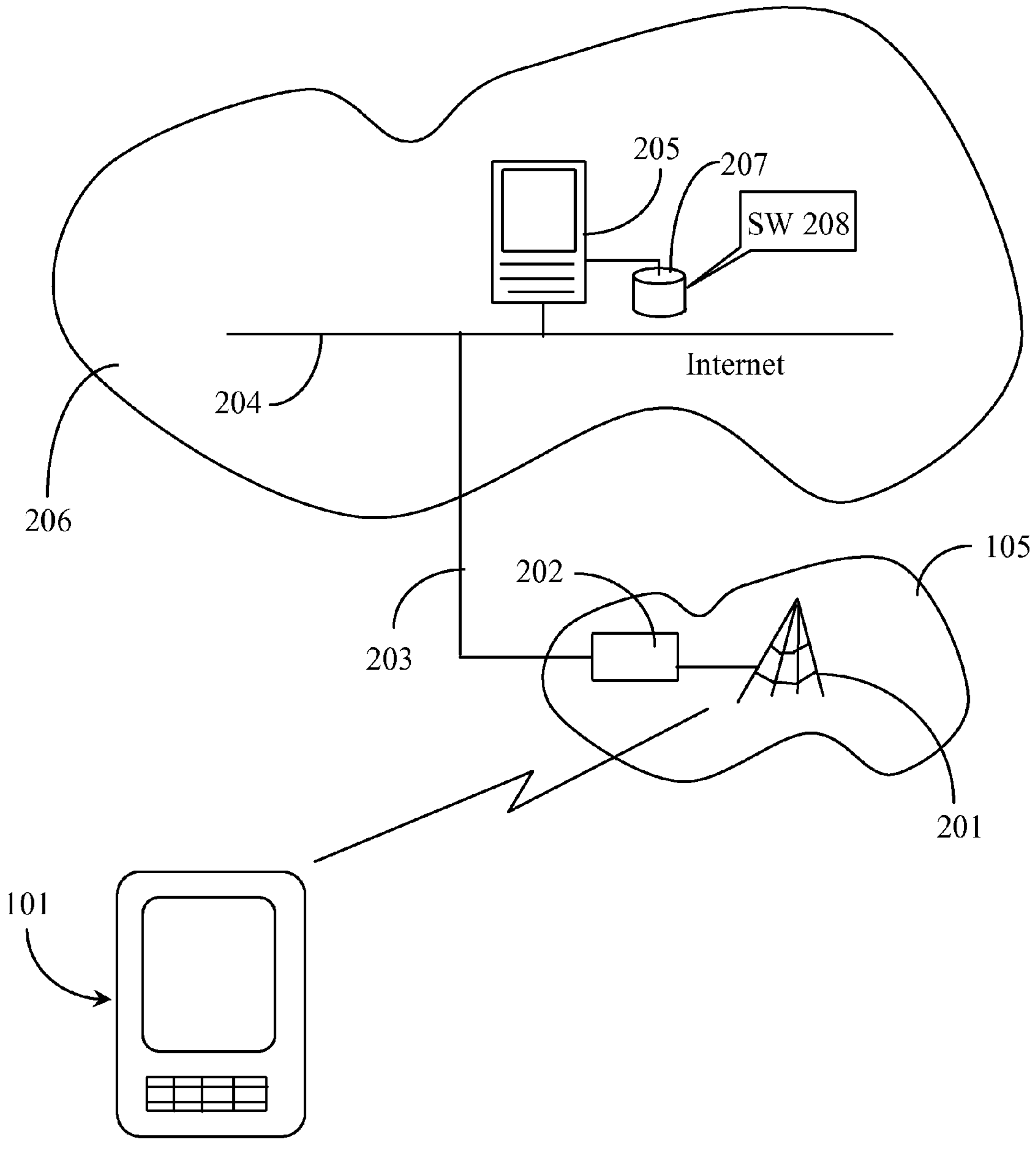
FIG. 2 is an architecture diagram illustrating elements and network connectivity in an embodiment of the invention.

FIG. 2 is an architectural diagram representing device 101 connected through cellular network 105 by a base station and through a gateway 202 and path 203 to Internet backbone 204. Backbone 204 represents all of the connections and interconnections in the Internet network. An Internet connected server 205, hosted by an enterprise not shown, is coupled to a database 207, which includes a non-transitory digital medium from which Server 205 may execute software 208.

In one embodiment of the invention App 110 executing on device 101 monitors, while coupled to Link 109, all or part of the diagnostic information available in the OBD system of the vehicle. Upon determining a problem or issue, typically by a trouble code, that may require attention, App 110 accesses stored information, from storage 104 and displays to the driver the fact of the issue requiring attention, and suggests a solution, or at least a path to a solution. In some cases the display may be interactive, and the driver may clear the trouble code. In some embodiments association from trouble codes to a potential solution are not made by App 110 directly, but may be provided by App 110 relaying codes and data to Server 205 in the Internet, which server may return the potential solution or suggestion.

There are many codes and issues available from most OBD systems. These include fuel status, main battery charge status for an electrical vehicle, battery status for a gas-powered vehicle, status of air bags, brake condition, oil life left to a recommended change, tire pressure, and much more. Typically when something is amiss a code associated with the trouble may be read from the vehicle's OBD system.

Figure 3:
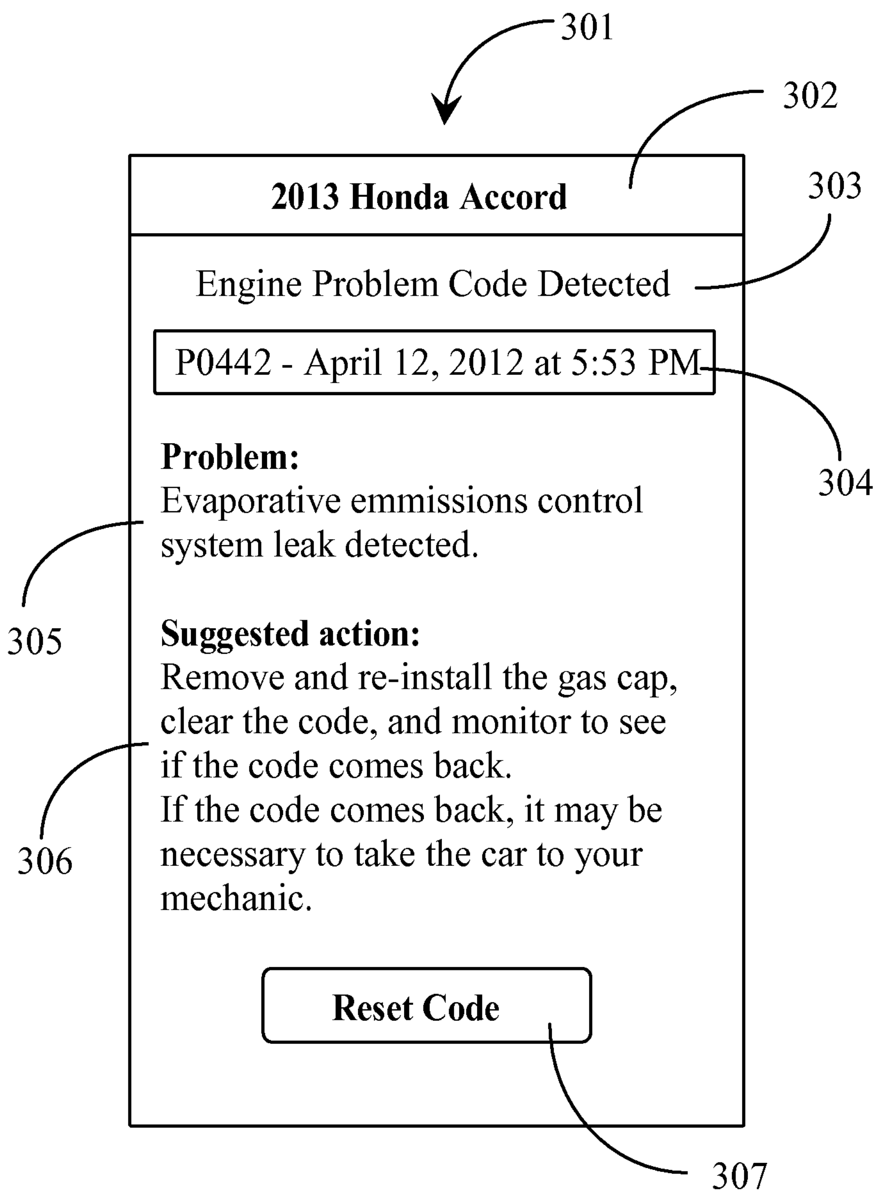
FIG. 3 is an illustration of a display presented to a driver in an embodiment of the invention.

FIG. 3 shows an exemplary user interface 301 on the mobile device. The user can read the trouble code currently active in her vehicle, when the code first appeared, a description of the problem, and possible solution to the problem. The user may also reset the code on the mobile device, which transmits a command to the hardware device to clear the code in the vehicle.

In FIG. 3 the identity of the vehicle is presented in box 302. In some embodiments this identity may be fixed for a driver who has just one vehicle for which the system may be used. In some embodiments a driver may have more than one vehicle, and there may be a selection in the display for the driver to select the correct vehicle. In some embodiments the driver may be registered with an enterprise hosting server 205, and the server may maintain a record, which may be updated and edited by the driver in a web page, associating the driver with different vehicles.

In this example at line 303 the issue triggering the present display is presented, in this case that an Engine Problem Code has been detected. The actual code is displayed at box 304. The specific problem is spelled out at 305, and suggested action is presented at 306. Interactive button 307 enables the driver to reset the code in the vehicle's OBD system.

In some embodiments of this invention server 205 in communication with device 101 and the OBD system of the automobile through Link 109 may be able to determine the make and model of the vehicle by access to the vehicle's on-board computerized systems. In an embodiment wherein Server 205 cooperated with App 110 executing on device 101, the server may access an extensive database that is pre-prepared to associate trouble codes for a wide variety of vehicle makes and models, and to select and transmit to device 101 and App 110 the correct information for the make and model.

In some embodiments of the system the mobile device executing App 110 saves instances of codes detected and the data and displays presented to the driver, and archives these for future reference. App 110 in some embodiments has a link for accessing the archived information and downloading or printing the information. In some embodiments the archiving function is performed by Server 205.

It will be apparent to the skilled person that there may be many alterations that may be made in embodiments described herein without altering the overall scope of the invention. The scope of the invention is limited only by the claims that follow.

The invention claimed is:

1. A system, comprising a link device coupled to an on-board diagnostics (OBD) system of a vehicle, the link device enabled to directly monitor trouble codes presented by the OBD system, and having a communication port enabled to transmit to and receive from external devices;

a mobile communication device associated with, and local to a driver of the vehicle, the device having a display screen and local data storage; and an application (App) executing on the mobile communication device from a non-transitory medium;

wherein the App monitors the vehicle OBD system via a near-field pairing mechanism directly pairing with the communication port and the mobile communication device and the App receives trouble codes from the vehicle OBD system, via the link device, where the App associates trouble codes with the issues they represent by accessing local storage, and wherein the App presents a display to the driver comprising at least the issue represented by the trouble code and suggested action to correct the problem issue and the display further comprises identity of the vehicle, the actual trouble codes detected, and a link button providing a signal to the link device to cause the OBD system to cancel the trouble code or codes.

2. The system of claim 1 wherein the link device connects directly to an OBD connector of the vehicle.

3. The system of claim 1 wherein the display screen is a touch screen.

4. The system of claim 1 wherein the App associates the trouble codes with the issue represented by the trouble code and possible corrections by only accessing information from the local data storage.

5. The system of claim 4 wherein trouble codes received and displays presented are archived by the mobile communication device for future reference, in a manner that the archived material may be downloaded and printed.

6. A method, comprising steps:

receiving trouble codes from a vehicle on-board diagnostics (OBD) system, as they occur, by a link device coupled to the OBD system;

transmitting the trouble codes directly to a mobile communication device associated with and local to a driver of the vehicle via a near-field pairing mechanism directly pairing with a communication port of the Link device and the mobile communication device;

associating the trouble codes with the issues they represent by an application (App) executing on the mobile communications device by accessing only local storage;

presenting a display on a display screen of the mobile communications device, the display comprising at least the trouble codes, the issues represented by the trouble codes and suggested action to correct the issues; and cancelling the trouble codes by the App via a link button providing a signal to the link device to directly cause the OBD system to cancel the trouble codes, wherein the display further comprises identity of the vehicle.

7. The method of claim 6 wherein the link device connects directly to an OBD connector of the vehicle.

8. The method of claim 6 wherein the display screen is a touch screen.

9. The method of claim 6 wherein trouble codes received and displays presented are archived by the mobile communication device for future reference, in a manner that the archived material may be downloaded and printed.

* * * * *